United States Patent

[11] 3,614,491

| [72] | Inventors | Otto Anna<br>Niederhochstadt;<br>Jochen Kassner, Kronberg; Bernhard<br>Druen, Schwalbach, all of Germany |
|---|---|---|
| [21] | Appl. No. | 43,133 |
| [22] | Filed | June 3, 1970 |
| [45] | Patented | Oct. 19, 1971 |
| [73] | Assignee | Braun Aktiengesellschaft<br>Frankfurt/Main, Germany |
| [32] | Priority | June 27, 1969 |
| [33] | | Luxembourg |
| [31] | | 58,982 |

[54] ELECTRICALLY OPERATED MOTION CONVERSION MEANS
9 Claims, 2 Drawing Figs.

[52] U.S. Cl. .................................................... 310/37
[51] Int. Cl. ..................................................... H02k 7/06
[50] Field of Search............................................ 310/15, 19,
20, 21, 22, 25, 29, 32, 33, 36–39; 30/45; 318/131

[56] References Cited
UNITED STATES PATENTS
1,034,620  8/1912  Ivatts........................... 310/29

Primary Examiner—D. F. Duggan
Attorney—Michael S. Striker

ABSTRACT: An electric motor has an oscillating armature which performs in a predetermined time interval a first number of oscillations corresponding to the cycles of an alternating current supplied to it. An oscillatory output member is arranged to be driven by the motor. Mechanical means cooperates with the armature and the output member and imparts to the latter in the aforementioned time interval a second number of oscillations which is double the first number.

PATENTED OCT 19 1971

3,614,491

INVENTOR.
OTTO ANNA
BY JOCHEN KASSNER

Michael S. Striker
Attorney 3,614,491

ELECTRICALLY OPERATED MOTION CONVERSION MEANS

BACKGROUND OF THE INVENTION

The present invention relates generally to electrically operated devices, and more particularly to electrically operated devices having electric motors which utilize an oscillating armature. The invention is particularly concerned, but not exclusively so, with such small electrically operated devices as electric shavers and similar apparatus.

Small electrically operated devices of the type under discussion, especially electric shavers, electric toothbrushes and the like, are generally operated with the 5- or 60-cycle alternating net current. However, very frequently these devices require a higher number of cycles for their operating frequency, for instance 100 or 120 cycles. This necessitates that the cycles of the alternating current derived from the current supply be doubled and it is customary to utilize in these devices electric motors of the type having an oscillating armature. In these motors the armature performs a complete oscillation with each half-cycle of the current, meaning that the armature oscillates at double the cycles or frequency of the alternating current itself. This achieves the desired aim, but at the same time it causes difficulties in that the operational efficiency of these devices is considerably lower than that of similar devices which operate at the net frequency. Evidently this is undesirable and, in many cases, completely unacceptable.

SUMMARY OF THE INVENTION

It is, accordingly, an object of the present invention to overcome the aforementioned disadvantages of the prior art.

More particularly it is an object of the present invention to provide an electrically operated device of the type under discussion wherein the operating frequency of the device is double the net frequency or number of cycles of the alternating current supplied to it, without however incurring significant losses in the efficiency of the electric motor.

A concomitant object of the invention is to provide such a device which is simple and inexpensive in its construction and assembly.

Still a further object of the invention is to provide such a device which is very reliable in operation.

In pursuance of the above objects, and others which will become apparent hereafter, one feature of the invention resides in an electrically operated device of the type in question which, briefly stated, comprises electric motor means having an oscillating armature operative for performing in a predetermined time interval a first number of oscillations corresponding to the cycles of an alternating current supplied to it. An oscillatory output member is arranged to be driven by the motor means, and mechanical means cooperates with the armature and the output member and serves for imparting to the latter in the aforementioned time interval a second number of oscillations which is double the first number.

Thus, the invention avoids the heretofore customary electromagnetic approach to doubling the operating frequency of the device as compared with the net cycles or frequency of an alternating current supplied to the motor of the device. Instead, the present invention uses a purely mechanical converting arrangement which, surprisingly, is able to achieve the desired results in a simpler and less expensive manner and with significantly lower losses than the more customary and more sophisticated electromagnetic approach which was heretofore used in the art for this problem.

By resorting to the present invention it is possible to utilize oscillating armature electric motors of significantly lighter weight than heretofore, with a high effectiveness and, thanks to the lower frequency required of the operation of the motors also with less noise. This is particularly advantageous in electrical devices where light weight and quiet operation are desirable or perhaps even necessary. A further advantage which is of importance in some circumstances is the fact that in the device according to the present invention the electric motor will use significantly less electrical current while providing the same output efficiency as a motor in a prior art device of the type under discussion having the same output efficiency.

It is particularly advantageous if the construction according to the present invention utilizes as part of the mechanical means a coupling element which connects an oscillatory mechanical member with the oscillating armature in such a manner that the directions of movements of the two points where the coupling members is connected with the oscillatory member and with the armature are normal to each other in one position of the armature, preferably the mid or center position, and that in this position both coupling points are aligned on a line which is normal to the direction of the movement performed by the point where the coupling member is connected with the armature. It will be appreciated that the point at which the coupling member is connected with the oscillatory member will reverse its direction of movement twice as often as the armature, meaning that it oscillates with double the frequency or at double the number of cycles.

It is advantageous that the oscillatory member be configurated as a swing member. Because in this type of arrangement bearing play is of great importance, the invention provides in accordance with an advantageous embodiment that the coupling member is either connected via the intermediary of leaf springs, or is itself configurated as a leaf spring. This eliminates losses due to wear and a reduction in the function of the device due to bearing play.

Finally it is advantageous in the interest of a simple and inexpensive production and assembly of the device according to the present invention, that at least two components of the system composed of the armature, the coupling member and the oscillatory member be of unitary construction and preferably consist of resilient synthetic plastic material. To reduce losses due to restoring or bending forces exerted by the leaf springs involved, it is advantageous that the resonance of each leaf spring is matched to the operating frequency of the device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
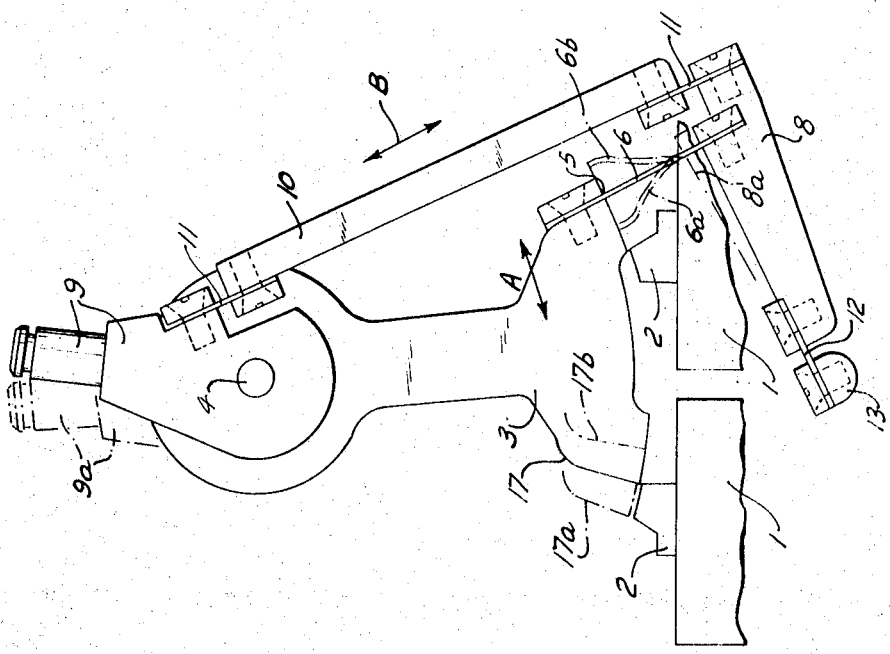
FIG. 1 is a somewhat diagrammatic detail view of a first embodiment according to the present invention, components of the device which are not essential to an understanding of the invention having been omitted for the sake of clarity.

Discussing now the drawing in detail, and firstly the embodiment illustrated in FIG. 1 thereof, it is pointed out that reference number 1 identifies energizing coils 1 of a conventional electric motor having an oscillating armature. Such electric motors are well enough known not to require detailed discussion and no claim is made as to the novelty of construction of the motor per se. Pole shoes 2 extend out of the coils 1, also in conventional manner. Mounted oppositely to the pole shoes 2 in a pivot 4 which is journaled in the nonillustrated housing of the device, is a permanently magnetic armature 3 which oscillates in the direction of the double-headed arrow A upon energization of the coils 1 in conventional manner. The armature 3 is illustrated in its mid or center position in full lines, and for reference purposes its lateral edge portion 17 is also illustrated in broken lines in its left-hand and right-hand end positions which are respectively identified with reference numerals 17a and 17b. An oscillatory output member 9 is shown in full lines and pivots about the same pivot as the armature 3; the full-line illustration shows the output member 9 in one end position whereas the opposite end position is illustrated in broken lines and identified with reference numeral 9a.

According to the present invention mechanical means is utilized for doubling the number of oscillatory motions performed by the armature 3, and transmitting this doubled number of oscillatory motions to the output 9. It will be appreciated that if for instance the oscillatory armature 3 performs 50 oscillations per minute, meaning that the electric motor is operated with a 50-cycle alternating current, then the mechanical arrangement doubles this number of cycles or oscillations so that the output member 9 will perform 100 oscillatory movements during the same time period.

The mechanical arrangement according to the present invention comprises an arm 8 which is swingably or pivotally mounted via a leaf spring 12 on a housing portion 13. It is connected via a linkage member 10 with the output member 9, and it is pointed out that leaf springs 11 are interposed between the member 8 and the member 10 on the one hand, and the member 10 and the member 9 on the other hand.

A coupling member 6 is provided which here is configurated as a leaf spring. In the center or rest position of the leaf spring 6 the latter extends normal to the direction of oscillation of the armature 3, as identified by the double-headed arrow A. The leaf spring 6 is connected with the armature 3 at point 5, and with the member 8 at the point 7. When the armature 3 moves to the position in which the edge 17 will be located at 17a, the leaf spring 6 will be deflected to the broken-line position 6a; conversely, when the armature 3 moves from the illustrated full-line position to the one in which its edge 17 moves to the position 17b, then the leaf spring will be deflected to the broken-line position 6b. It will be appreciated that the point 7 can move essentially only in the direction normal to the direction of the movement of the point 5, which direction is the same as the one signified by the double-headed arrow A. Therefore, the direction of movement of the point 7 is that signified by the double-headed arrow B.

When the armature 3 moves from its illustrated center position to the position 17a or the position 17b, the point 5 is correspondingly deflected so that the leaf spring 6 moves to the position 6a or 6b. Because of the connection of leaf spring 6 with the member 8 at point 7 the leaf spring cannot follow in toto this movement and must therefore assume the flexed and inclined position illustrated in broken lines at 6a and 6b, respectively. This causes the point 7 to be shifted in the direction of the double-headed arrow B towards the armature 3 or more specifically towards the pivot 4, and the member 8 of course performs the same movement. When the armature 3 then returns from the position 17a or 17b to the full-line center position, the movement is reversed and the member 8—which had moved to the broken-line position identified with reference numeral 8a—returns to its full-line position. The distance through which the point 7 moves toward and away from the pivot 4 is independent of the direction of oscillation of the armature 3, that is it is independent of whether the armature 3 moves to the position 17a or 17b. Whenever the armature 3 moves from the illustrated full-line center position of its edge 17 to one of the positions 17a or 17b, and back to the full-line center position—meaning that the armature 3 has just performed half an oscillation—the member 8 moves from its illustrated full-line position so that it performs a complete oscillation. The movement of the member 8 is therefore double that of the armature 3, so that the mechanical doubling of the rate of oscillation of the armature 3 has taken place. The movement of the member 8 is then transmitted via the member 10 to the output member 9 which in turn is of course in an operative device coupled with an element to be moved, for instance an electric shaver with the cutting head, in an electric toothbrush with the brush holder, and so on.

Figure 2:
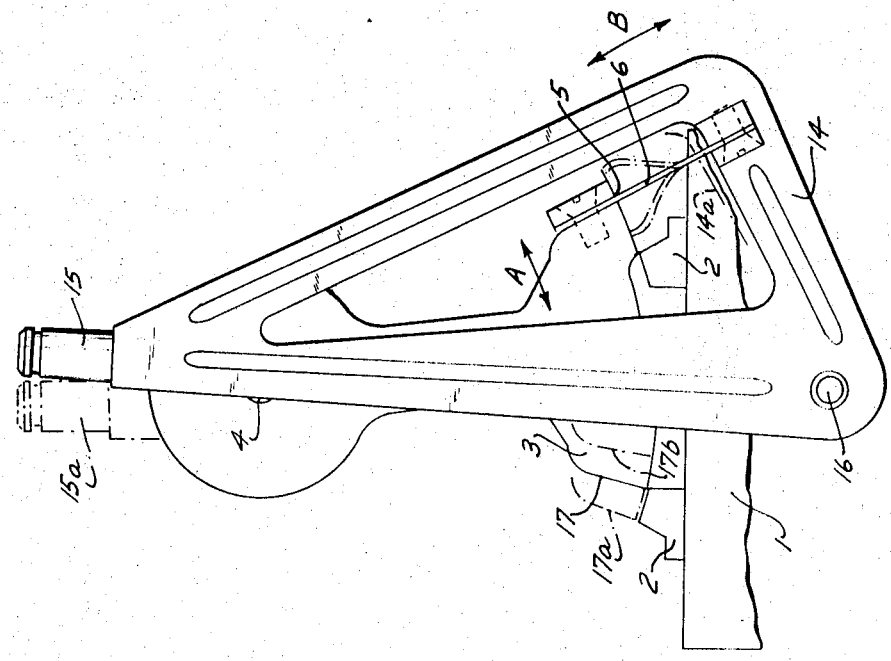
FIG. 2 is a view similar to FIG. 1 but illustrating a further embodiment of the invention.

The present invention is illustrated by way of a further embodiment in FIG. 2. The same reference numerals have been used in FIG. 2 for elements which are identical with those of FIG. 1. The embodiment of FIG. 2 differs from that of FIG. 1 essentially in that the members 8 and 10, the leaf springs 11 and 12 have been replaced by the pivotable member 14 which is pivoted for movement about the pivot 16, it being evident that the pivot 16 in turn is mounted on or in the nonillustrated housing of the device. Reference numeral 14a is the equivalent of the position 8a illustrated in FIG. 1. The operation of the embodiment in FIG. 2 is the same as that of FIG. 1 except that in FIG. 2 the movement of the member 14 is transmitted directly to the member 15 which replaces the member 9 and is of one piece with the member 14. Thus, the journaling illustrated in FIG. 1 for the member 9 about the pivot 4 no longer exists for the member 15 in FIG. 2. Of course, the armature 3 is still journaled on the pivot 4. The members 14 and 15 are rigid with one another.

It will be appreciated that the present invention is utilizable not only with an oscillating armature drive, as shown in the drawing, but also with any type of oscillating drive, be it in form of an oscillating armature or not. Also, the mechanical means utilized in accordance with the present invention can of course be employed for quadrupling the oscillatory movement with reference to the operating cycles of an alternating current. This is done simply by using it with a drive which in itself operates with double the oscillations of the alternating-current cycles.

The invention is not limited to electrical shavers, as has already been pointed out before. It can be used in other devices also, for instance in electrical toothbrushes if the results obtained with the device according to the present invention are desired in such an apparatus, perhaps because a desired massage effect can be achieved only at double the number of oscillations which would normally be supplied by current cycle. In any case, the arrangement according to the present invention significantly reduces the weight of such devices, reduces the current requirements or permits the device to run more quietly at a higher frequency of oscillations than what has been known heretofore from the prior art. It is thus a genuine contribution to the art, especially in view of the surprising improvement achieved by the use of simpler means in lieu of the more sophisticated and less effective means heretofore employed in this field.

It will be understood that each of the elements described above, or two or more together, may also find a useful application in other types of constructions differing from the types described above.

While the invention has been illustrated and described as embodied in an electrically operated device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an electrically operated device, in combination, electric motor means having an oscillating armature operative for performing in a predetermined time interval a first number of oscillations corresponding to the cycles of an alternating current supplied to it; an oscillatory output member arranged to be driven by said motor means; and mechanical means cooperating with said armature and said output member and operative for imparting to the latter in said time interval a second number of oscillations which is double said first number, said mechanical means comprising an element mounted for movement with reference to said armature and coupled with said output member, and spring means having spaced unitary portions which are respectively connected with said element and said armature.

2. In a device as defined in claim 1, wherein the directions of movement of said spaced portions are normal to each other in one position of said armature, and wherein said spaced portions are aligned with one another in direction normal to the oscillation of said armature when the latter is in said one position.

3. In a device as defined in claim 2, wherein said armature moves from one to another end position and past a center position during each complete oscillation, and wherein said one position is said center position.

4. In a device as defined in claim 1; further comprising mounting means mounting said element for pivotal movement with reference to said armature.

5. In a device as defined in claim 1, wherein said spring means is a leaf spring.

6. In a device as defined in claim 1; further comprising leaf springs each connected with said spring means, and with said armature and element, respectively.

7. In a device as defined in claim 1; further comprising an additional element coupled with said spring means and said output member.

8. In a device as defined in claim 7, at least two of said elements, spring means and output member being unitary and consisting at least predominantly of resilient synthetic plastic material.

9. In a device as defined in claim 6, said spring means being a leaf spring means; and wherein the resonance of said leaf spring means and said leaf springs is matched to the operating frequency of said device.